(12) United States Patent
Park (10) Patent No.: US 6,515,400 B2
(45) Date of Patent: Feb. 4, 2003

(54) FLAT CORELESS VIBRATOR MOTOR (75) Inventor: Jei-Sung Park, Kyunggi-Do (KR)

(73) Assignee: Infortron Co., Ltd. (KR)

( * ) Notice: Subject to any disclaimer, the term of this patent is extended or adjusted under 35 U.S.C. 154(b) by 0 days.

(21) Appl. No.: 09/923,982

(22) Filed: Aug. 7, 2001

(65) Prior Publication Data

US 2002/0047469 A1 Apr. 25, 2002

(30) Foreign Application Priority Data

Aug. 21, 2000 (KR) ........................................ 2000-48329

(51) Int. Cl.[7] .............................................. H02K 13/04
(52) U.S. Cl. ......................................... 310/268; 310/81
(58) Field of Search ........................... 310/80, 81, 268, 310/154.05, 154.06, 184, 208

(56) References Cited

U.S. PATENT DOCUMENTS

| 4,382,214 | A | * | 5/1983 | Ban et al. .................... 318/254 |
| 4,605,874 | A | * | 8/1986 | Whiteley ............... 310/156.32 |
| 4,710,667 | A | * | 12/1987 | Whiteley .................... 310/164 |
| 5,793,133 | A | * | 8/1998 | Shiraki et al. .............. 310/179 |
| 5,942,833 | A | * | 8/1999 | Yamaguchi .................. 310/268 |
| 6,169,348 | B1 | * | 1/2001 | Won ............................. 310/81 |
| 6,246,143 | B1 | * | 6/2001 | Yamaguchi .................. 310/233 |
| 6,265,838 | B1 | * | 8/2001 | Won ............................. 310/114 |
| 6,384,498 | B1 | * | 5/2002 | Yamaguchi et al. ... 310/154.07 |
| 6,384,499 | B2 | * | 5/2002 | Yamaguchi .................... 310/81 |
| 2001/0013730 | A1 | * | 8/2001 | Yamaguchi .................... 310/81 |
| 2001/0040413 | A1 | * | 11/2001 | Yamaguchi .................... 310/81 |
| 2002/0047370 | A1 | * | 4/2002 | An et al. ....................... 310/81 |
| 2002/0047371 | A1 | * | 4/2002 | Yamaguchi .................... 310/81 |
| 2002/0047464 | A1 | * | 4/2002 | Yamaguchi .................. 310/233 |
| 2002/0074877 | A1 | * | 6/2002 | Lee et al. ...................... 310/81 |
| 2002/0093260 | A1 | * | 7/2002 | Yamaguchi .................... 310/81 |
| 2002/0096950 | A1 | * | 7/2002 | Kajiwara et al. ............. 310/81 |

FOREIGN PATENT DOCUMENTS

| JP | 63290143 | A | * | 12/1988 | .......... H02K/7/075 |
| JP | 402017853 | A | * | 1/1990 | .......... H02K/23/54 |
| JP | 9182366 | A | * | 12/1995 | .......... H02K/7/065 |
| JP | 409327150 | A | * | 12/1997 | .......... H02K/7/075 |
| JP | 410295067 | A | * | 11/1998 | .......... H02K/23/58 |
| JP | 410322970 | A | * | 12/1998 | .......... H02K/7/065 |
| JP | 2000092804 | A | * | 3/2000 | .......... H02K/23/58 |
| JP | 2000152585 | A | * | 5/2000 | .......... H02K/23/54 |
| JP | 2000224805 | A | * | 8/2000 | .......... H02K/7/075 |
| JP | 2001070882 | A | * | 3/2001 | .......... H02K/7/065 |
| JP | 2001298928 | | * | 10/2001 | .......... H02K/23/54 |

* cited by examiner

Primary Examiner—Karl Tamai
Assistant Examiner—Heba Yousri Elkassabgi
(74) Attorney, Agent, or Firm—Cantor Colburn LLP (57) ABSTRACT Disclosed is a flat coreless vibrator motor for supporting a vibration calling mode in a mobile communication device. The invention provides a flat coreless vibrator motor capable of preventing the formation of an idle point, thereby obtaining a high average torque, and thus, a high efficiency, while providing a sufficient redundant space for installing a weight for an increased centrifugal force. The flat coreless vibrator motor comprises a stator including a flat field magnet having a plurality of alternate N and S magnetic poles, a rotor spaced apart from the field magnet by a predetermined distance to rotate freely, and a brush for supplying a current to the coils via the commutator of the rotor. The rotor includes at least three coreless armature coils and a commutator connected to the coils, and at least two of the armature coils are integrally formed together at a same position to form a non-coil section in the rotor.

5 Claims, 7 Drawing Sheets

FIG.1

Prior Art

FIG.2

Prior Art

FIG.3a

Prior Art

FIG.3b

Prior Art

FIG.3c

Prior Art

FIG.3d

Prior Art

FLAT CORELESS VIBRATOR MOTOR

BACKGROUND OF THE INVENTION

1. Field of the Invention

The present invention relates to a flat coreless DC motor, and more particularly to a flat coreless vibrator motor for supporting a vibration calling mode in a mobile communication device.

2. Description of the Related Art

Generally, coreless DC motors are called "moving coil DC motors". Such coreless DC motors are mainly classified into cylindrical and disc types. Disc type coreless DC motors are also classified into pancake motors, printed motors, and three-coil motors.

Among such DC motors, three-coil motors, which have a light structure, are generally used for a miniature, lightness, and low power consumption of mobile communication devices. Three-coil motors developed at an early stage are disclosed in Japanese Patent Laid-open Publication No. Sho. 63-290140 and Japanese Patent Application No. Hei. 4-295503. Disclosed in Japanese Patent Laid-open Publication No. Sho. 63-290140 is an eccentric plate mounted to the output shaft of a DC motor having a general construction. Japanese Patent Application No. Hei. 4-295503 discloses a rotor in which three armature coils eccentrically arranged to form a flat sector shape without overlapping with one another.

Figure 1:
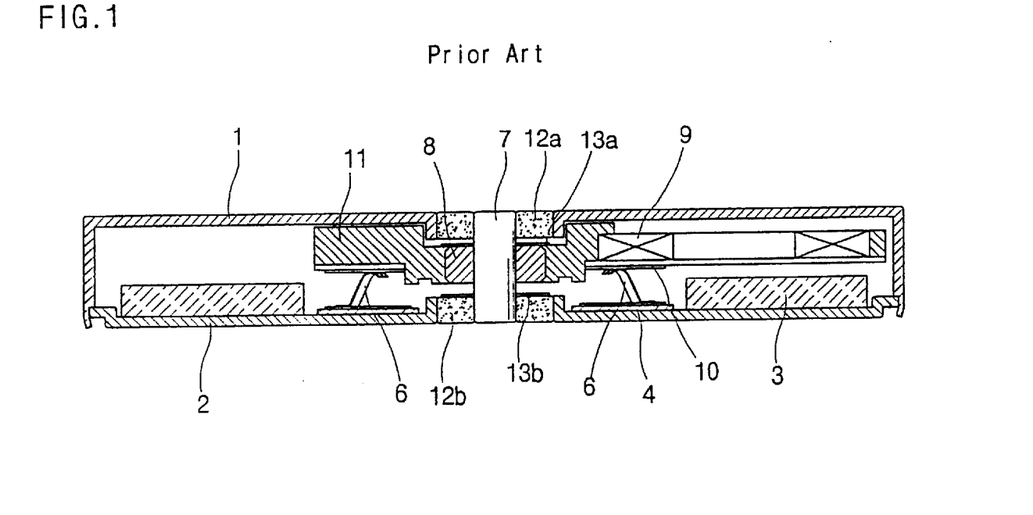
FIG. 1 is a sectional view illustrating a conventional flat coreless DC motor.
Figure 2:
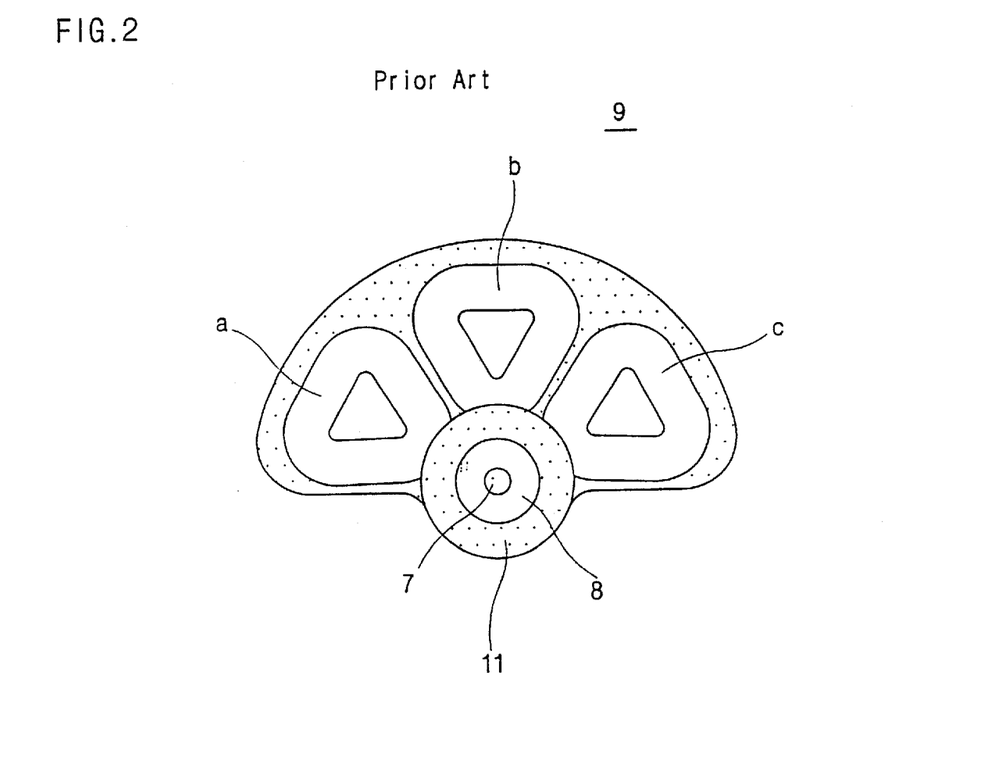
FIG. 2 is a plan view of the conventional flat coreless DC motor as shown in FIG. 1.

Now, a conventional coreless DC motor including a sector-shaped rotor will be described in conjunction with FIGS. 1 and 2. FIG. 1 is a sectional view illustrating the conventional flat coreless DC motor. FIG. 2 is a plan view of the conventional flat coreless DC motor as shown in FIG. 1. As shown in FIGS. 1 and 2, the flat coreless DC motor includes an eccentric rotor 9 having armature coils a, b, and c eccentrically arranged, and a shaft 7 arranged at a center of the eccentric rotor 9. The flat coreless DC motor also includes a housing having a case 1 for supporting the eccentric rotor 9 while allowing the eccentric rotor 9 to rotate freely, and a bracket 2. The flat coreless DC motor further includes a magnet 3 for supplying a magnetic flux to the eccentric rotor 9, a brush 6 arranged inside the magnet 3 under the condition in which a brush base 4 is interposed between the magnet 3 and brush 6, and a commutator 10 arranged on a surface of the eccentric rotor 9 facing the magnet 3. The brush 6 is slidable along the commutator 10 at its one end while being in contact with the commutator 10. In FIGS. 1 and 2, the reference numeral 8 denotes a separation preventing holder made of brass. Where a separation preventing means such as a joint is provided at the shaft 7, the separation preventing holder 8 may be dispensed with. The reference numeral 11 denotes a synthetic resin molded on the eccentric rotor 9. Typically, a glass fiber reinforced polybutylene terephtalate. The reference numerals 13a and 13b denote thrust washers, respectively.

However, since recent research made in association with such motors is to provide a miniature and light structure, those motors cannot generate a sufficient centrifugal force. Furthermore, in the case of the sector-shaped rotor, there is a limitation on an increase in centrifugal force because it is difficult to provide a space for a weight, such as lead beads, to be integrally formed at the rotor.

Figure 3A:
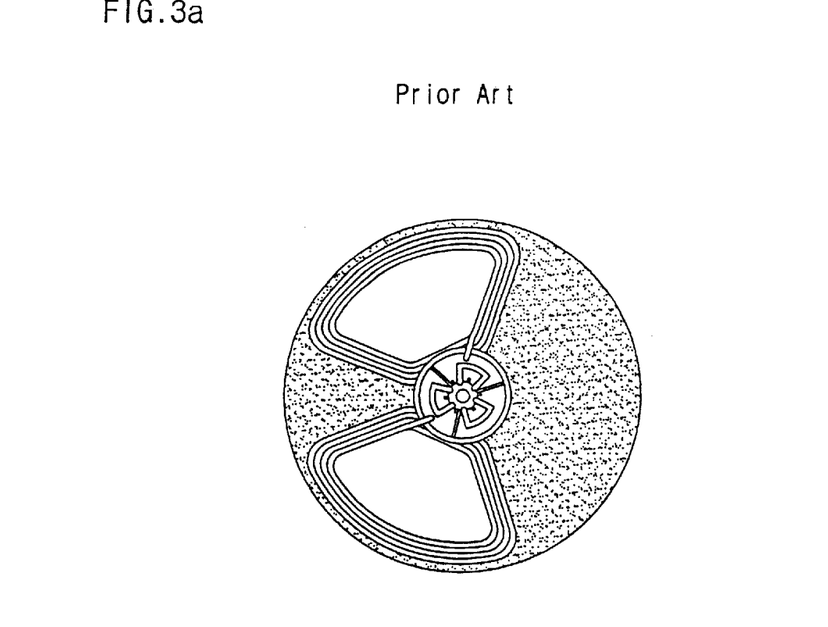
FIGS. 3a and 3b illustrate sectional views respectively illustrating two rotor structures disclosed in Japanese Patent Laid-open Publication No. Sho. 63-290140.
Figure 3B:
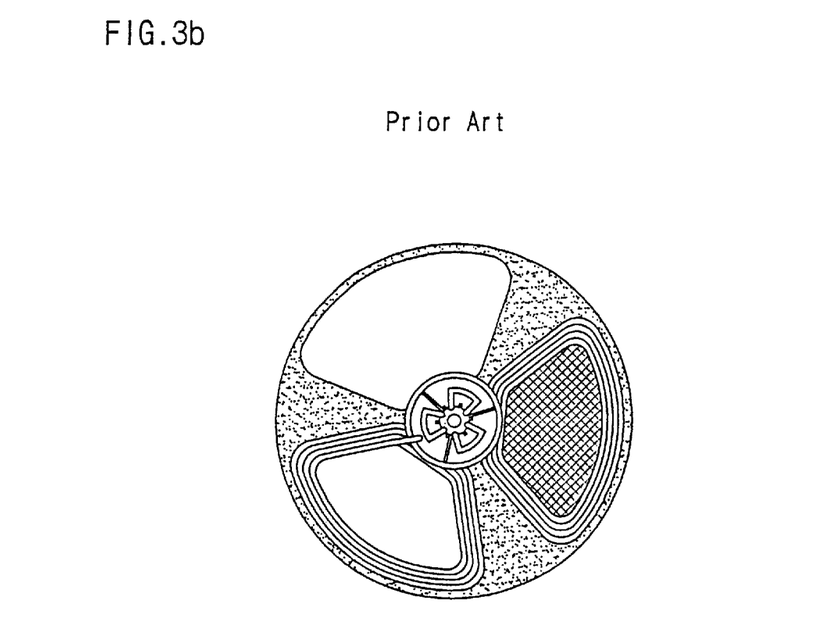
Figure 3C:
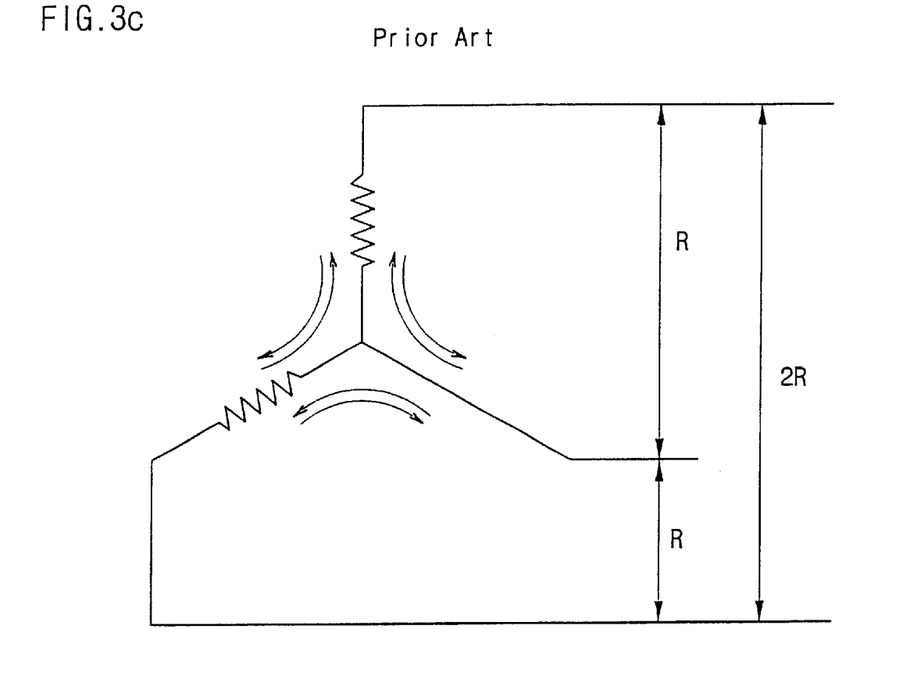
FIG. 3c is a circuit diagram illustrating an armature coil circuit of the conventional motor.
Figure 3D:
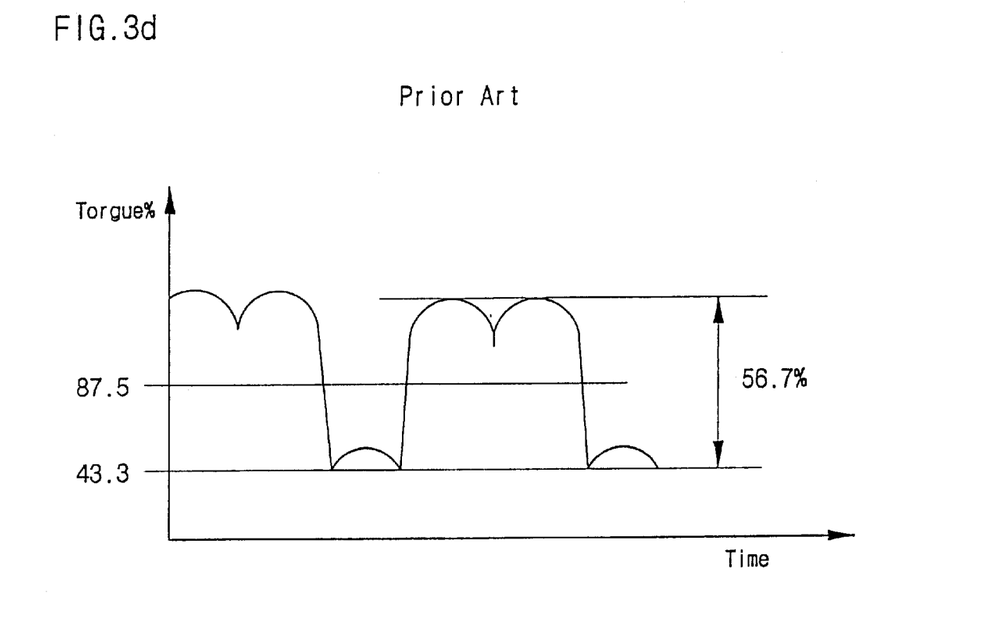
FIG. 3d is a graph depicting torque characteristics of the conventional motor.

Another conventional type of rotor is also disclosed in Japanese Patent Laid-open Publication No. Sho. 63-290140 issued on Nov. 28, 1988. In this publication, a rotor structure is disclosed, in which a part of three armature coils uniformly spaced apart from one another by 120° is eliminated. FIGS. 3a and 3b illustrate two rotor structures disclosed in the publication. FIG. 3c illustrates an armature coil circuit of the conventional motor. FIG. 3d is a graph depicting torque characteristics of the conventional motor. As shown in these drawings, the conventional motor is driven in a general fashion, that is, in a 3-phase 120° constant current conduction fashion. In the case of a general 3-phase 120° 3-coil type coreless motor, a high efficiency, for example, an average torque of 95.5% and a torque ripple of 13.4%, is obtained because torque ripples generated at respective phases are equal. However, the above mentioned motor exhibits a degraded efficiency, for example, an average torque of 87.5% and a torque ripple of 56.7, because a non-uniformity in resistance occurs at one of the phases during the operation of the motor by virtue of the elimination of one coil, as shown in FIGS. 3c and 3d. As a result, the centrifugal force generated during the rotation of the motor is reduced, thereby resulting in vibrations of a degraded quality having a high frequency.

As apparent from the above description, it is difficult to provide a sufficient space for installing a weight adapted to obtain an increased centrifugal force, in the case of the conventional 3-coil type vibrator motor. Where a part of coils is eliminated, there are problems in that vibrations of a degraded quality having a high frequency are generated due to the formation of an idle point or a reduction in average torque.

SUMMARY OF THE INVENTION

Therefore, an object of the invention is to solve the above mentioned problems and to provide a vibrator motor capable of preventing the formation of an idle point, thereby obtaining a high average torque, and thus, a high efficiency, while providing a sufficient redundant space for installing a weight adapted to obtain an increase in centrifugal force.

In accordance with the present invention, this object is accomplished by providing a coreless DC motor comprising: a stator including a flat field magnet having a plurality of alternate N and S magnetic poles; a rotor spaced apart from the field magnet by a predetermined space to rotate freely, the rotor including at least three coreless armature coils and a commutator connected to the coils, at least two of the coreless armature coils being integrally formed together at a same position to form a non-coil section in the rotor; and a brush for supplying a current to the coils via the commutator of the rotor.

In accordance with the present invention, the armature coils having the double coil structure may have a size larger than that of the remaining coils.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, the present invention will be described in detail with reference to preferred embodiments illustrated in the annexed drawings.

Figure 4:
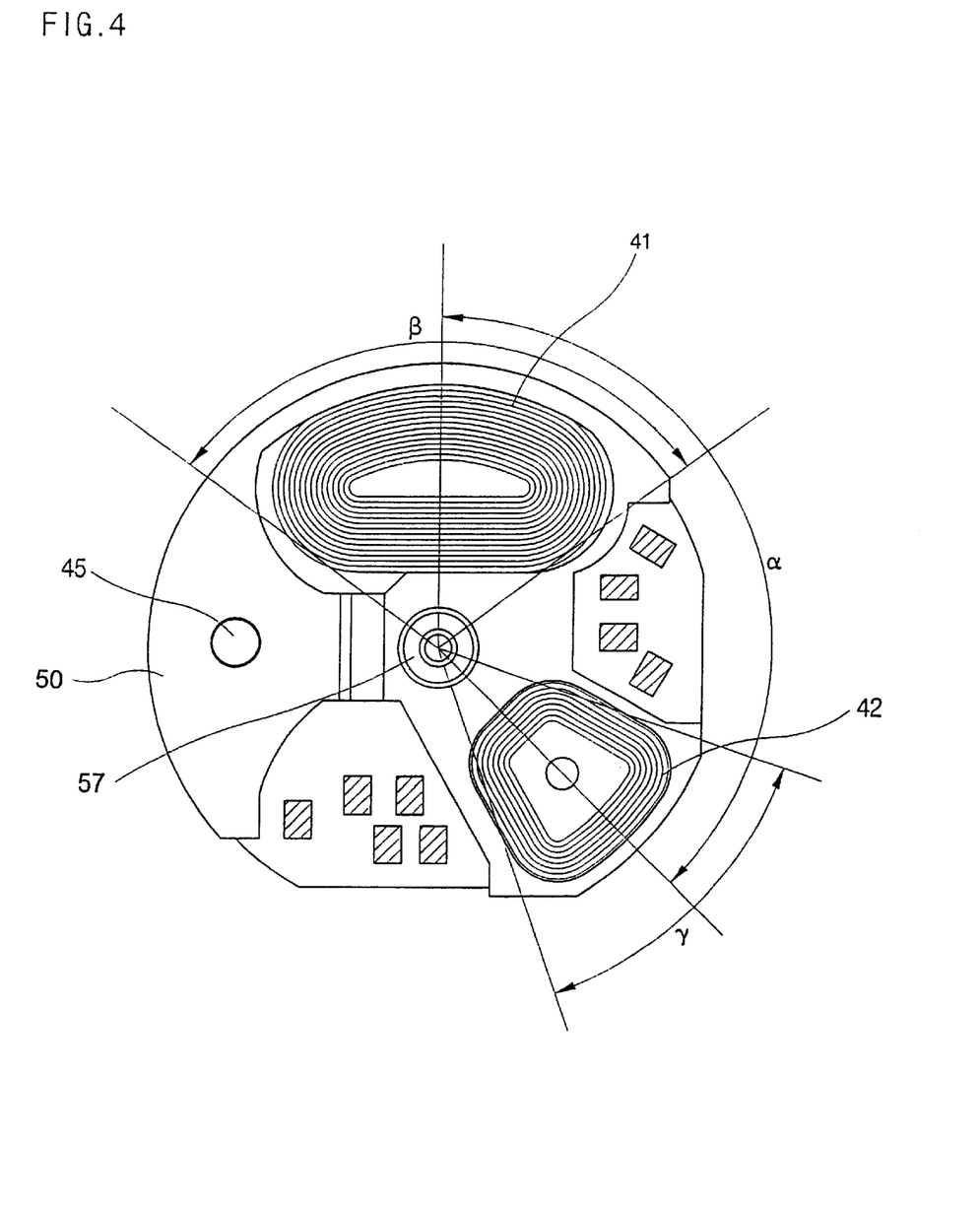
FIG. 4 is a plan view illustrating the rotor part of a coreless DC motor according to a preferred embodiment of the present invention.
Figure 5:
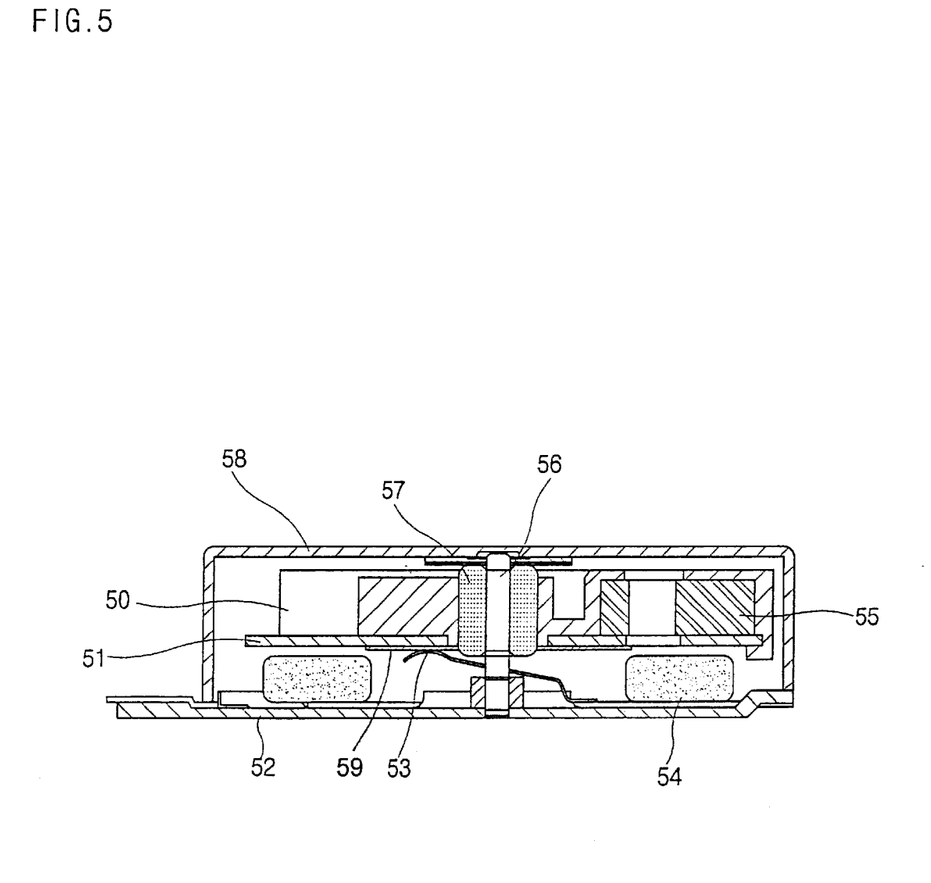
FIG. 5 is a sectional view of the coreless DC motor as shown in FIG. 4.

FIG. 4 is a plan view illustrating the rotor part of a coreless DC motor, according to a preferred embodiment of the present invention. FIG. 5 is a sectional view of the coreless DC motor as shown in FIG. 4. As shown in FIGS. 4 and 5, the coreless DC motor according to the preferred embodiment of the present invention includes a rotor 50 rotatably supported by a shaft 56 fixedly mounted to a bracket 52 via a rotation support means, such as bearings 57, and a case 58 for enclosing the rotor 50. A coil 55 is fixedly mounted to the rotor 50, and faces a stator 54 with a predetermined distance therebetween. The stator includes a flat field magnet having an arrangement of alternate N and S magnetic poles. In a preferred embodiment of the present invention, the field magnet is a magnet having a circular arrangement of four alternate N and S poles, that is, NSNS. A power line for supplying an external electric power is connected to the bracket 52. A brush 53 is mounted to the bracket 52 so that the brush 53 comes into frictional contact with a flat commutator 59 printed on a PCB mold 51 formed at the rotor 50.

In accordance with one aspect of the present invention, two armature coils are overlapped with each other at a same position to form a double coil structure. That is, the coils 41 are wound together at a same position, thereby forming a double coil structure. In accordance with the illustrated embodiment, although the armature coils 41 and 42 form three phases and operate in a general 3-phase 120° constant current driving fashion, as in conventional motors, two of those three coils are wound together at a same position to form a double coil structure. In this case, the three coils have a same resistance R. In accordance with this aspect of the present invention, it is possible to provide a sufficient redundant space by virtue of an arrangement of only two clusters of coils at the rotor without forming any idle point. Accordingly, a heavy weight 45 can be arranged at the redundant space, thereby achieving an increase in centrifugal force. As a result, excellent vibration frequency characteristics can be obtained. The position of the weight 45 may be optionally selected. That is, the weight 45 may be arranged at an optional position, taking into consideration of a weight center of the rotor determined prior to the installation of the weight.

In accordance with another aspect of the present invention, the armature coil having a double coil structure has a size larger than that of the remaining coil 42. That is, the coil 41 having a double coil structure has a size larger than that of the coil 42 having a single coil structure. The angle defined between the coils 41 and 42 (that is, "α" in FIG. 4) is 135°. Also, the larger one of the coils, that is, the coil 41, has a phase angle β of 60° whereas the smaller coil 42 has a phase angle γ of 30°. These angles will be described in more detail, in conjunction with FIG. 6.

Figure 6:
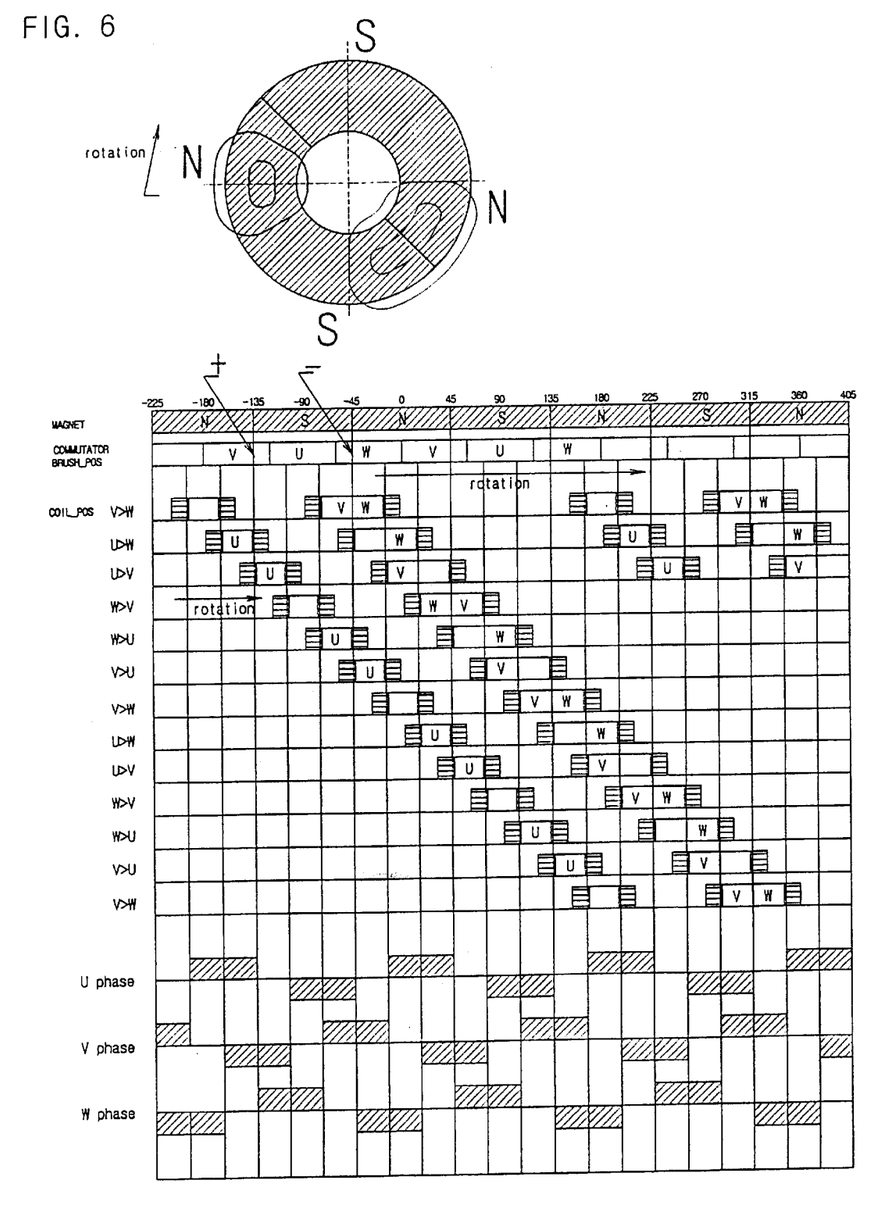
FIG. 6 is a view illustrating positions of coils relative to a magnet of a stator depending on a position of a brush in accordance with the embodiment of the present invention.
Figure 7:
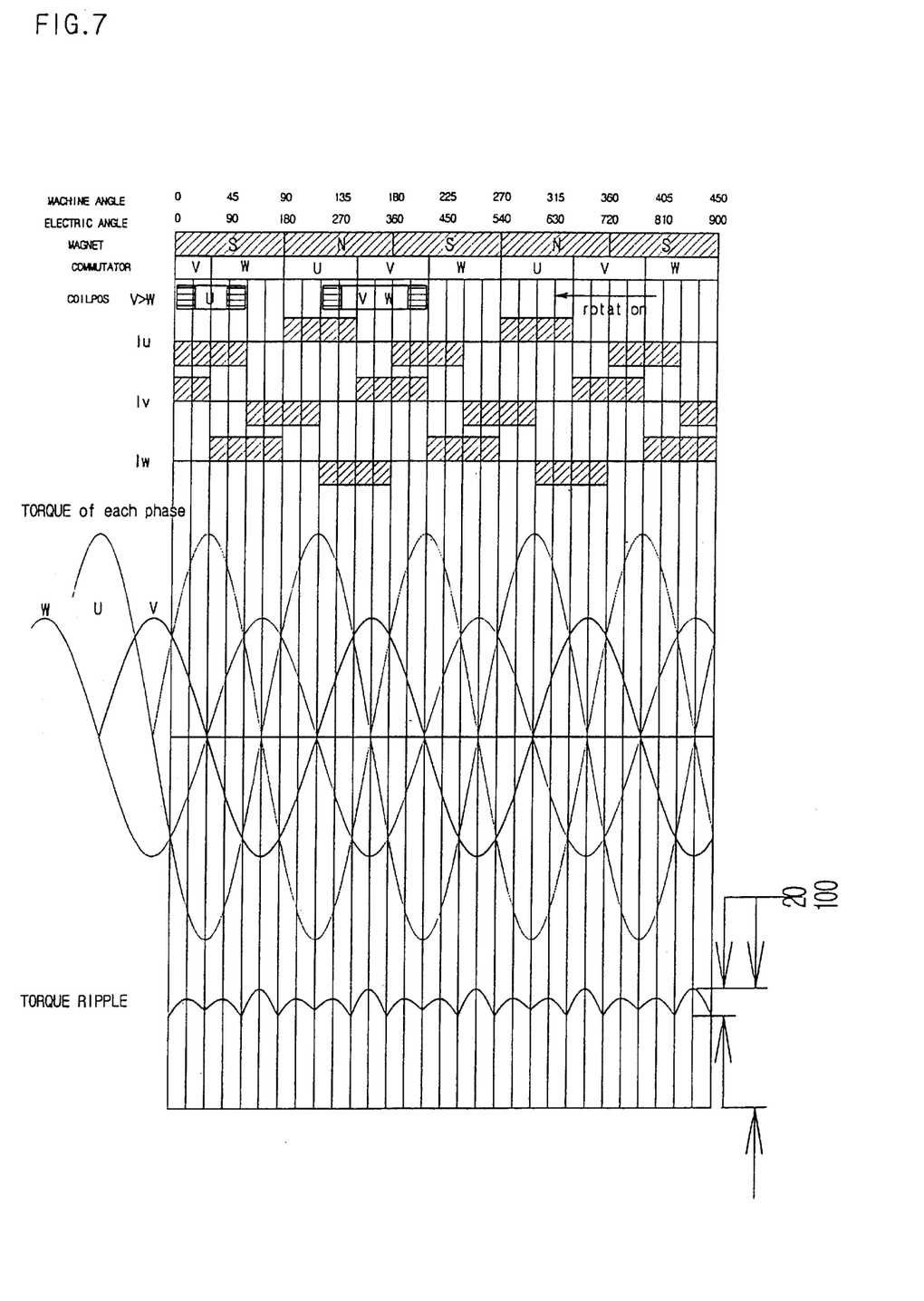
FIG. 7 is a view illustrating a variation in torque exhibited at each phase in accordance with the embodiment of the present invention.

FIG. 6 illustrates the positions of the coils relative to the magnet of the stator 54 depending on the position of the flat commutator, with which the brush 53 is in contact, in accordance with the embodiment of the present invention applied to the above mentioned 3-coil system. Referring to FIG. 6, when the angle α defined between the coils 41 and 42 is 135°, and the phase angle β of the double coil 41 is 60° corresponding to two times the angle γ of the single coil 42 in accordance with the another aspect of the present invention, an optimum electromagnetic positional relationship is maintained between the coils and the magnet of the stator 54. This can be also confirmed by a torque curve shown in FIG. 7. As shown in FIG. 7, uniform torque characteristics are obtained at all phases in accordance with the configuration of the present invention. In accordance with a calculation based on the torque curve, the configuration of the above mentioned embodiment generates an average torque of 95.5% and a torque ripple of 13.4% which are identical to those of general 3-phase coreless motor. Since the motor of the present invention maintains a 2-coil and 3-conductor arrangement in terms of an operation mechanism, a weight having a sufficiently large size to generate a desired centrifugal force, for example, a weight made of a metal having a high specific weight, can be arranged in a redundant space formed at the rotor, where the coils are arranged, for example, at the position where the weight 45 is arranged as shown in FIG. 4. Accordingly, it is possible to obtain a high centrifugal force. As a result, an increased torque can be generated, using a same power consumption as in conventional motors. Thus, vibrations of a good quality are obtained using a reduced electric power.

As apparent from the above description, the present invention provides a flat coreless vibrator motor having a 2-coil and 3-conductor arrangement, in terms of an operation mechanism, which has a sufficient redundant space for installing a weight to obtain an increased centrifugal force while maintaining a same resistance at all phases during a 3-phase conduction, thereby obtaining vibrations of a good quality. Moreover, the flat coreless vibrator motor of the present invention achieves a reduction in manufacturing costs because two coils are formed to have an integral structure.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A 3-phase coreless DC motor comprising:

a stator including a flat field magnet having a plurality of alternate N and S magnetic poles;

a rotor spaced apart from the field magnet by a predetermined distance to rotate freely, the rotor including three coreless armature coils of different phases and a commutator connected to the coils; and a brush for supplying a current to the coils via the commutator of the rotor, wherein two of the coreless armature coils are wound together at a same position to form a double coil structure, and the armature coils of the double coil structure have a size larger than that of the other armature coil of a single coil structure.

2. The 3-phase coreless DC motor according to claim 1, further comprising a weight disposed in the non-coil section.

3. The 3-phase coreless DC motor according to claim 1, wherein the armature coils of the double coil structure define an angle of 135° with respect to the other coil of the single coil structure and have a phase angle of 60°, and the other coil of the single coil structure has a phase angle of 30°.

4. The 3-phase coreless DC motor according to claim 1, further comprising:
    a bracket for supporting the stator; and
    a shaft mounted to the bracket, for rotatably supporting the rotor.

5. The 3-phase coreless DC motor according to claim 4, wherein the armature coils of the double coil structure define an angle of 135° with respect to the other coil of the single coil structure and have a phase angle of 60°, and the other coil of the single coil structure has a phase angle of 30°.

* * * * *

UNITED STATES PATENT AND TRADEMARK OFFICE
CERTIFICATE OF CORRECTION

PATENT NO. : 6,515,400 B2
DATED : February 4, 2003
INVENTOR(S) : Jei-Sung Park It is certified that error appears in the above-identified patent and that said Letters Patent is hereby corrected as shown below:

<u>Title page,</u>
Item [73], should read as follows:
-- Woosung Enterprise Co., Ltd. --

Signed and Sealed this

Twenty-seventh Day of May, 2003

JAMES E. ROGAN
*Director of the United States Patent and Trademark Office*